United States Patent
Holliday et al.

(10) Patent No.: US 11,080,881 B2
(45) Date of Patent: Aug. 3, 2021

(54) DETECTION AND IDENTIFICATION SYSTEMS FOR HUMANS OR OBJECTS

(71) Applicant: Infrared Integrated Systems Limited, Northamptonshire (GB)

(72) Inventors: Stuart Andrew Holliday, Northamptonshire (GB); Timothy J. Wheatley, Northamptonshire (GB); Neil Johnson, Devon (GB)

(73) Assignee: Infrared Integrated Systems Limited, Northamptonshire (GB)

( * ) Notice: Subject to any disclaimer, the term of this patent is extended or adjusted under 35 U.S.C. 154(b) by 67 days.

(21) Appl. No.: 16/447,282

(22) Filed: Jun. 20, 2019

(65) Prior Publication Data
US 2019/0392605 A1 Dec. 26, 2019

Related U.S. Application Data

(60) Provisional application No. 62/688,634, filed on Jun. 22, 2018.

(51) Int. Cl.
*G06T 7/70* (2017.01)
*G06T 7/20* (2017.01)

(52) U.S. Cl.
CPC .................. *G06T 7/70* (2017.01); *G06T 7/20* (2013.01); *G06T 2207/10048* (2013.01); *G06T 2207/30242* (2013.01)

(58) Field of Classification Search
CPC ..... G06T 2219/2016; G06T 7/70; G06T 7/20; G05D 1/0234
See application file for complete search history.

(56) References Cited

U.S. PATENT DOCUMENTS 5,581,625 A 12/1996 Connell
6,712,269 B1 3/2004 Watkins
(Continued)

FOREIGN PATENT DOCUMENTS

EP 1798670 A1 6/2007
EP 3229047 A1 10/2017
WO 2019191146 A1 10/2019

OTHER PUBLICATIONS

Basalamah, A., "Sensing the Crowds Using Bluetooth Low Energy Tags," IEEE Access, 4:4225-4233, Aug. 2016.
(Continued)

*Primary Examiner* — Jingge Wu
(74) *Attorney, Agent, or Firm* — Fredrikson & Byron, P.A.

(57) ABSTRACT

Some systems include an illuminator configured to illuminate a scene, a detector configured to receive electromagnetic radiation from the scene, one or more retroreflective tags, and an image processor. Each of the one or more retroreflective tags is attached to or positioned near a corresponding target and is configured to reflect electromagnetic radiation from the illuminator toward the detector. The image processor can identify electromagnetic radiation reflected by one or more retroreflective tags to determine the presence of one or more retroreflective tags and corresponding targets in the scene. Retroreflective tags can include retroreflective portions and non-retroreflective portions such that, when electromagnetic radiation is incident upon the retroreflective tag, the retroreflective tag reflects the electromagnetic radiation in a pattern that corresponds to a code uniquely corresponding to the target. An image processor can determine the presence of a target based on identifying the unique code of the retroreflective tag.

22 Claims, 7 Drawing Sheets

(56) References Cited

U.S. PATENT DOCUMENTS

| | | | |
|---|---|---|---|
| 7,623,936 B1 | 11/2009 | Qu et al. | |
| 7,652,687 B2 | 1/2010 | Sorensen | |
| 7,702,132 B2 | 4/2010 | Crabtree | |
| 7,778,855 B2 | 8/2010 | Holliday | |
| 8,615,420 B2 | 12/2013 | Holliday | |
| 9,993,166 B1* | 6/2018 | Johnson | A61B 5/0022 |
| 2005/0104959 A1 | 5/2005 | Han et al. | |
| 2005/0222723 A1* | 10/2005 | Estes | G06Q 10/08 |
| | | | 701/29.3 |
| 2007/0008113 A1* | 1/2007 | Spoonhower | A61J 3/007 |
| | | | 340/539.12 |
| 2008/0067244 A1* | 3/2008 | Marks | G01V 15/00 |
| | | | 235/385 |
| 2008/0077511 A1* | 3/2008 | Zimmerman | G06Q 10/00 |
| | | | 705/28 |
| 2009/0009770 A1 | 1/2009 | Connelly et al. | |
| 2010/0039233 A1* | 2/2010 | Niedzwiecki | H04Q 9/00 |
| | | | 340/10.1 |
| 2010/0061553 A1* | 3/2010 | Chaum | H04N 21/44213 |
| | | | 380/200 |
| 2010/0235004 A1 | 9/2010 | Thind | |
| 2010/0299116 A1 | 11/2010 | Tomastik et al. | |
| 2011/0024500 A1* | 2/2011 | McReynolds | G06K 17/0022 |
| | | | 235/385 |
| 2011/0213588 A1 | 9/2011 | Lin et al. | |
| 2012/0191272 A1* | 7/2012 | Andersen | B66F 9/24 |
| | | | 701/2 |
| 2012/0274775 A1* | 11/2012 | Reiffel | G06Q 30/08 |
| | | | 348/158 |
| 2012/0281094 A1 | 11/2012 | Forshaw | |
| 2012/0310376 A1 | 12/2012 | Krumm et al. | |
| 2014/0107846 A1 | 4/2014 | Li | |
| 2015/0022321 A1* | 1/2015 | Lefevre | G06K 19/07345 |
| | | | 340/10.1 |
| 2015/0032556 A1 | 1/2015 | Evans et al. | |
| 2015/0224640 A1* | 8/2015 | Vu | B25J 5/007 |
| | | | 700/259 |
| 2015/0235237 A1* | 8/2015 | Shaw | G06Q 30/0201 |
| | | | 705/7.29 |
| 2015/0339920 A1* | 11/2015 | Cortelyou | G06K 9/00771 |
| | | | 340/907 |
| 2017/0181401 A1* | 6/2017 | Lefevre | A01K 29/005 |
| 2017/0316262 A1 | 11/2017 | Holliday et al. | |
| 2018/0089616 A1* | 3/2018 | Jacobus | G05D 1/0274 |
| 2019/0012607 A1 | 1/2019 | Holliday et al. | |

OTHER PUBLICATIONS

International Search Report and the Written Opinion of the ISA/EP in PCT/EP2019/066525 dated Sep. 23, 2019, 14 pgs.

Yamamiya et al., "Using Infrared-Transparent Pigments to Identify Objects," Systems and Computers in Japan, 33(10):74-82, Sep. 2002.

Senior, Andrew W., et al "Video analytics for retail", 2007 IEEE Conference on Advanced Video and Signal Based Surveillance. IEEE, 2007, 6 pgs.

International Search Report and Written Opinion of the ISA/EP in PCT/EP2020/050603, dated Mar. 31, 2020, 12 pgs.

Hanchuan, et al., "ID-Match: A Hybrid Computer Vision and RFID System for Recognizing Individuals in Groups", In Proceedings of the 2016 CHI Conference on Human Factors in Computing Systems, 12 pgs.

Fukuda, et al., "Personal identification in dynamic images using UHF band RFID system for service provision", 2008 IEEE International Conference on Multisensor Fusion and Integration for Intelligent Systems, 6 pgs.

Antunes, D., "Multi-sensor Based Localization and Tracking for Intelligent Environments," Dissertation to obtain the Master Degree in Informatics and Computer Engineering, Technical University of Lisbon, Oct. 2011, 88 pgs.

Connell et al. "Retail Video Analytics: An Overview and Survey," Video Surveillance and Transportation Imaging Applications, Proc. vol. 8663. International Society for Optics and Photonics, Mar. 2013.

Extended Search Report for EP Application No. 14178914.9, dated Jul. 3, 2015, 6 pgs.

Texas Instruments, "Introduction to the Time-of-Flight (ToF) System Design," Users Guide, Literature No. SBAU219D, May 2014, 32 pgs.

Texas Instruments, "Time-of-Flight Camera—An Introduction," Technical White Paper, Literature No. SLOA190B, May 2014, 10 pgs.

* cited by examiner

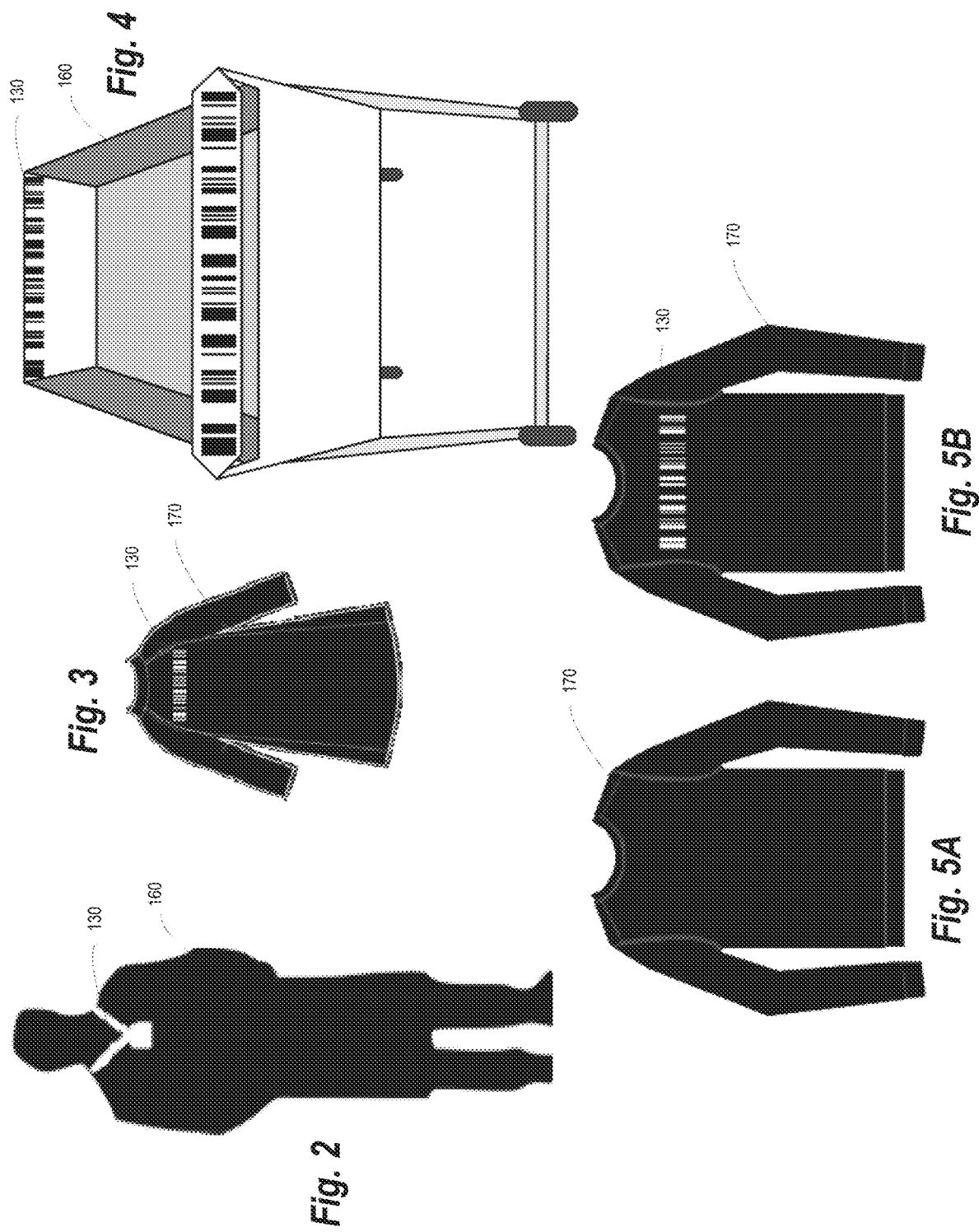

DETECTION AND IDENTIFICATION SYSTEMS FOR HUMANS OR OBJECTS

CROSS REFERENCE TO RELATED APPLICATION

This application claims the benefit of U.S. Provisional Patent Application No. 62/688,634, filed Jun. 22, 2018. The entire content of this application is incorporated herein by reference.

BACKGROUND

Several known systems and methods exist to count or detect people or objects, for example near points of service, such as customers waiting in line at retail locations, people or objects at shop floors, airports, hospitals, secured areas, and the like. Counting and detection systems may facilitate shortening wait times at a point of service, and monitor traffic (e.g., number of people present in a specific location) in an area of interest. Such systems are described, for instance, in U.S. 2017/0316262A1 and U.S. 2015/0032556 A1 each assigned to InfraRed Integrated Systems Ltd., Northampton, GB. Another count and detection system is the Gazelle 2 Dual View System developed by InfraRed Integrated Systems Ltd., Northampton, GB.

Some such detection and counting systems typically rely on directly detecting and counting people, using direct detection/sensing method such as video analytics from CCTV coverage of the space, direct human counting (e.g., via biometric recognition) or RFID, WiFi or other tags, active transmitters, optical methods (e.g., reflective clothing, identification badges and the like). Such systems may also rely on people crossing an area (e.g., a "virtual" line being crossed) to determine a count.

While such systems may provide an overall count of people or objects in the space, it may not provide additional data relating to counted people or objects. For instance, such systems may not be able to ignore people or objects not necessary for a count. In one such case, several known counting and detection systems may not be able to ignore specific people (e.g., staff members) from the total count (e.g., including staff members and visitors/customers). In some such cases, for instance, a single staff member may walk past a sensed area (e.g., a specific hallway or a door) multiple times during a day. Because the system is unable to distinguish between staff members and customers, the system may end up counting a single staff member several times in the count, and therefore distort the count. This problem may be exacerbated in situations where traffic from several staff members through a door is a significant fraction of the total traffic of people in a retail outlet.

Moreover, known systems for counting people or objects may be complex for deployment in several environments (e.g., commercially active retail districts), or may be intrusive. In particular, optical systems that involve the use of reflective badges may not be suitable in locations where ambient light levels are sufficiently high to interfere with detection of the system.

SUMMARY

Some aspects of the disclosure are directed toward a detection system for detecting targets in a scene. Systems can include an illuminator configured to generate electromagnetic radiation and illuminate a scene, such as a scene including one or more people, and a detector configured to receive electromagnetic radiation from the scene.

Systems can include one or more retroreflective tags attached to or positioned near one or more targets. The retroreflective tag can be configured to reflect incident electromagnetic radiation received from the illuminator toward the detector. The direction of the reflected electromagnetic radiation can be generally parallel to and opposite to a direction of incident electromagnetic radiation from the illuminator.

Systems can include an image processor in communication with the illuminator and/or the detector. The image processor can be configured to identify electromagnetic radiation reflected by the one or more retroreflective tags, analyze the identified reflected electromagnetic radiation to determine a presence of one or more retroreflective tags in the scene. The image processor can determine a number of retroreflective tags and corresponding targets in the scene.

In some systems, a retroreflective tag configured to have retroreflective portions and non-retroreflective portions such that, when electromagnetic radiation is incident upon the retroreflective tag, the retroreflective tag reflects the electromagnetic radiation in a pattern that corresponds to a code uniquely corresponding to the target. The image processor can analyze electromagnetic radiation received by the detector to determine the presence of the target based on identifying the unique code of the retroreflective tag. In some systems, a plurality of retroreflective tags can include unique codes such that the retroreflective tags are identifiable via the image processor.

In some systems, an image processor is configured to analyze a probability of a target being present in a target scene. For example, in an embodiment, an image processor can increment a probability of the target being present in the scene to a first value if the image processor determines that the retroreflective tag is present in the scene. Additionally or alternatively, an image processor can analyze the received electromagnetic radiation from the detector to determine a value of an attribute and compare the value of the attribute of the retroreflective tag to an expected value of the attribute. The image processor can, if the value of the attribute of the retroreflective tag matches the expected value, increment the probability of the target being present in the scene to a second value.

The details of one or more examples are set forth in the accompanying drawings and the description below. Other features, objects, and advantages will be apparent from the description and drawings, and from the claims.

BRIEF DESCRIPTION OF DRAWINGS

FIGS. 2, 3 and 4 illustrate various embodiments of a retroreflective tag usable with the counting and detection system of FIG. 1;

FIGS. 5A and 5B are appearances of a retroreflective tag, according to one embodiment, when illuminated by electromagnetic radiation of two different wavelengths;

DETAILED DESCRIPTION

Systems and methods disclosed herein can be used for identifying certain people or objects 114, based data captured from sensing devices. In some aspects of the disclosure, systems and methods disclosed herein are capable of distinguishing people or objects 114 from others, for a variety of purposes. For example, in retail applications, it may be beneficial to count the number of people entering a store. However, in such cases, it may be advantageous to be able to exclude the staff members who work at the store from the count so that the door counts more accurately reflect the true number of customers. In another example, it may be beneficial for an automatic queue measurement system to be able to ignore staff members when determining the length of the queue, so that the queue measurement is accurate. In yet another example, systems and methods disclosed herein may be used to identify if people are walking the wrong way down a corridor, but ignore certain members of staff in airports, train stations, and in secure facilities such as power plants, military sites, or prisons, or in a factory or industrial location that may have hazardous environments in which only certain personnel are authorized access. In further examples, systems and methods disclosed herein can be used to identify and track individual shopping carts within a store, containers within a warehouse, to track the movement of vehicles, and the like. However, it should be understood that the disclosed embodiments may be applied to a wide range of applications involving counting specific targets 160 and excluding other people or objects 114.

Figure 1:
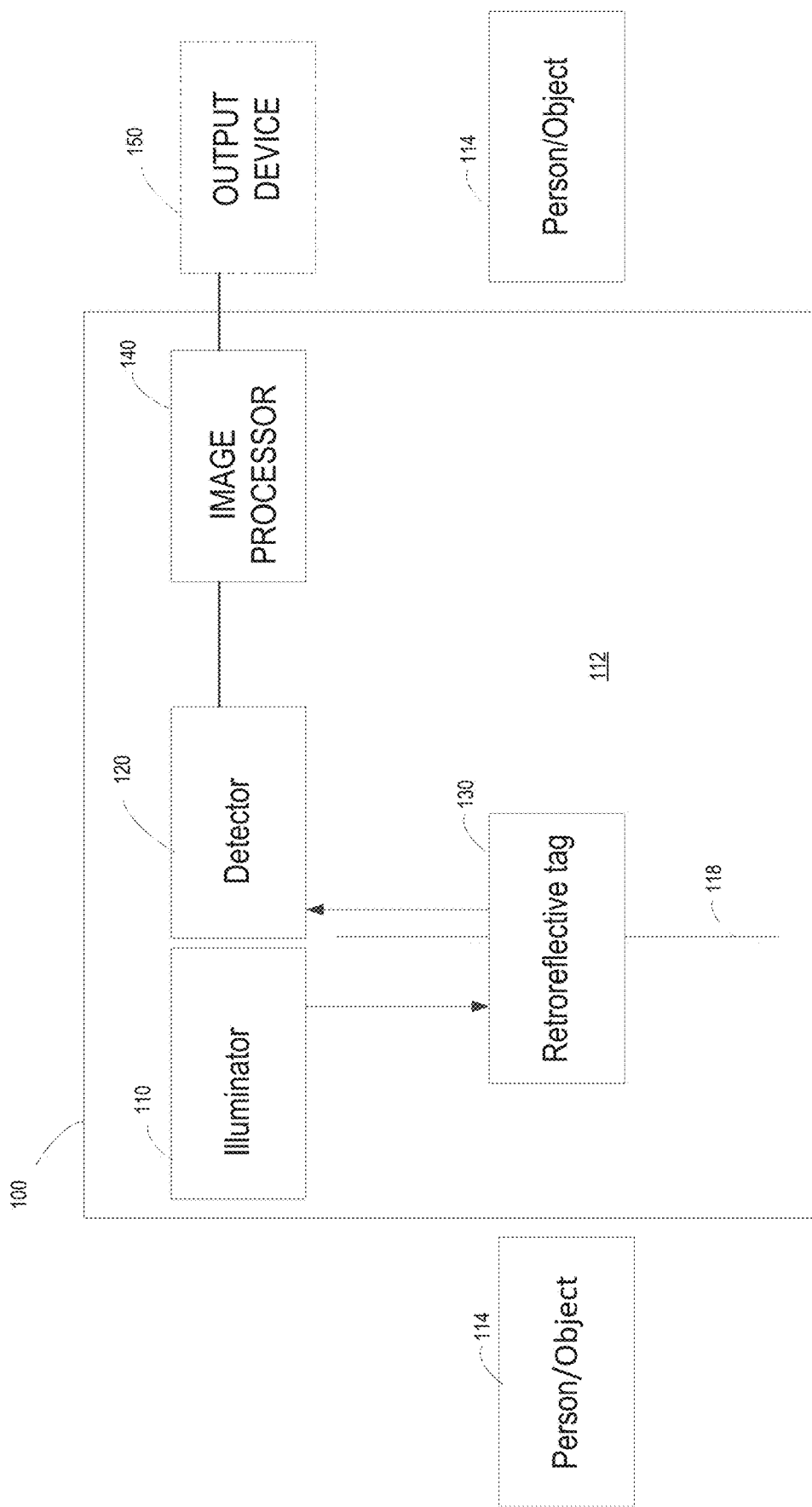
FIG. 1 is an overall schematic of a counting and detection system according to an embodiment of the present disclosure.

FIG. 1 is an overall schematic of the detection system 100 according to an embodiment. As disclosed herein, the detection system 100 comprises one or more of the following: an illuminator 110, a detector 120, a retroreflective tag 130, an image processor 140, and an output device 150.

In some exemplary embodiments, the illuminator 110 can be configured to generate electromagnetic radiation and thereby illuminate at least portions of a space 112 in which people or objects 114 are to be detected, identified and/or counted. In some embodiments, the illuminator 110 can generate modulated light. In some such embodiments, the modulation produces square waves of high frequency, such as between 20-100 MHz. Embodiments which involve the use of high frequency modulated light may result in improved accuracy of detection of specific targets 160 (e.g., staff members) and distinguishing targets 160 from background objects 114 or people (e.g., customers, visitors) that may have background electromagnetic radiation at levels that differ from radiation associated with the target as will be described further below. As used herein, the term "background electromagnetic radiation" may include the electromagnetic radiation reflected by the retroreflective tag 130 (positioned near or attached to the target) in a direction other than a direction parallel and opposite to the direction of the incident beam, as well other reflections such as those reflected by other objects 114 and/or people in the scene 112.

Alternatively, the illuminator 110 can include one or more of lasers, light emitting diodes (LEDs) or other sources of electromagnetic radiation emitting at desired frequencies (e.g., visible, near-infrared, infrared, terahertz, millimeter waves, and the like). In certain embodiments, the illuminator 110 can emit polarized light having preferred polarization (e.g., linear, circular, etc.) and the like. Alternatively or in addition, the illuminator 110 can also include structured illumination to create a grid or a pattern of light to illuminate a space 112 in which detection and counting is to be carried out.

Referring back to FIG. 1 the detection system 100 according to some embodiments includes a detector 120 configured to receive reflected electromagnetic radiation from the space 112 lit by the illuminator 110. The detector 120 can, in some cases, be an optoelectronic sensor or photodetector. In such cases, the detector 120 generates an electrical signal in response to sensing electromagnetic radiation. Alternatively, the detector 120 can be a camera and can capture an image of a scene 112 (e.g., the space 112 illuminated by the illuminator 110). In some such cases, the detector 120 can be a time of flight camera. Such embodiments may provide additional information relative to the target person or object. For instance, a distance between the detector 120 and the target may be obtained, as will be described further below. Examples of time of flight cameras suitable for use with the detection system 100 disclosed herein include RF-modulated light sources with phase detectors, range gated imagers, and direct time-of-flight imagers. In some aspects of the disclosure, time of flight cameras suitable for use with the detection system 100 disclosed herein include 3D time of flight sensors manufactured by Texas Instruments, such as OPT8320 3D Time-Of-Flight sensor. However, other time of flight sensors may be used as well, and the serial numbers and types of cameras provided herein are merely used as illustrative examples. Additional or alternative components include a camera development kit manufactured by Texas Instruments, that may include one or more time of flight imaging sensors, an analog front end, and a time of flight controller.

As described previously, in some embodiments, the illuminator 110 can generate electromagnetic radiation at a specific wavelength, or over one or more wavelength ranges. For example, the illuminator 110 can generate visible radiation and/or infrared radiation (e.g., greater than 700 nanometers, and/or less than about 3000 nanometers). In such additional or alternative embodiments, the detector 120 can be an infrared or visible light camera sensitive in the infrared and/or visible portions of the electromagnetic spectrum. Further, the detector 120 can have one or more bandpass filters that can transmit wavelengths in selected ranges and may not transmit radiation in wavelengths other than the selected wavelengths toward the detector 120. Such embodiments may permit better detection of targets 160 by reducing or eliminating radiation from wavelengths other than desired selected wavelengths. Such undesired wavelengths may include strong ambient light such as direct sunlight.

In some embodiments, as mentioned above, the illuminator 110 can generate polarized electromagnetic radiation (e.g., linear, elliptical, circular and/or randomly polarized radiation). In such cases, the detector 120 can include a polarizer to selectively transmit electromagnetic radiation from the target. For instance, in some embodiments, the target may change the polarization of the incident light (as will be described further below). In such cases, the polarizer provided on the detector 120 may be adjusted (e.g., rotated) to match the polarization of the electromagnetic radiation from the target so as to detect the electromagnetic radiation therefrom. Background electromagnetic radiation, not emitted by the illuminator 110, reflected from targets 160, other people or objects 114 (e.g. ambient lighting, sunlight, multiple reflections from reflective surfaces such as white paint, glass etc.) may have a different polarization. The polarizer may, in some such cases, permit reducing or elimination electromagnetic radiation from objects 114 or people other than target, and improve the probability that the detected electromagnetic radiation corresponds to that from the target. In a further embodiment, the polarization of radiation reflected by the retroreflective target might also be discriminated from the polarization of radiation emitted by the illuminator 110 and reflected by other people or surfaces in the scene 112. Accordingly, in certain advantageous embodiments, a polarizer provided on the detector 120 may advantageously permit the detector 120 to discriminate reflections from the target (reflected by the retroreflective tag 130) from all sources of reflected radiation from other parts of the scene 112, background and illuminator 110.

In some aspects, the radiation reflected from the target can be generally directed along the same direction as the incident beam, in which case the detector 120 can be placed such that the detector 120 intercepts most or all of the radiation from the target (as will be described further below). In some such embodiments, the detector 120 can be co-located with the illuminator 110. For instance, the detector 120 can be positioned generally coplanar with the illuminator 110 in some embodiments. However, in other embodiments, the detector 120 may be non-coplanar with the illuminator 110. The detector 120 and the illuminator 110 can sometimes be provided as a single module housed within a common housing. Alternatively, the detector 120 and the illuminator 110 can be separate components.

As described previously, the detection system 100 disclosed herein can be used for a number of applications. For instance, in one example, it may be desirable to identify specific groups of people (e.g., staff members) or objects 114, referred to as "target" or "targets 160" for various purposes (e.g., specific groups of people to be excluded from a count or to determine whether the person in the area has authorized access). Accordingly, some embodiments of the present disclosure include a retroreflective tag 130 worn or provided on targets 160 to identify the target based on the electromagnetic radiation detected by the detector 120.

Referring again to FIG. 1, the detection system 100 includes a retroreflective tag 130 co-located with the target. The retroreflective tag 130 can receive electromagnetic radiation generated by the illuminator 110 and reflect the received electromagnetic radiation toward the detector 120, such that a direction of the reflected electromagnetic radiation is generally parallel and opposite to a direction of the incident electromagnetic radiation. The retroreflective tag 130 can, in some embodiments as will be described further below, be configured to reflect the electromagnetic radiation received from the illuminator 110 such that the reflected electromagnetic radiation has an intensity greater than intensity of electromagnetic radiation emitted by the illuminator 110 and reflected from other surfaces in the scene 112 and background electromagnetic radiation, not emitted by the illuminator 110, reflected from targets 160, other people or objects 114 (e.g. ambient lighting, sunlight, multiple reflections from reflective surfaces such as white paint, glass etc.) Accordingly, when the detector 120 detects electromagnetic radiation, a signal corresponding to the radiation reflected by the retroreflective tag 130 has a stronger intensity relative to electromagnetic radiation emitted by the illuminator 110 and reflected from other surfaces in the scene 112 and background electromagnetic radiation, not emitted by the illuminator 110, reflected from targets 160, other people or objects 114 (e.g. ambient lighting, sunlight, multiple reflections from reflective surfaces such as white paint, glass etc.). For instance, if the detector 120 includes a camera, the retroreflective tag 130 may appear more prominently (e.g., brighter) in the image captured by the camera. Such embodiments may advantageously be applicable in instances where people or object counting and/or identification may have to be carried out in brightly lit spaces such as indoors lit by floodlights, outdoors on a sunny day, near reflective surfaces (e.g., stainless steel surfaces, bright white paint having high surface reflectivity, glass windows and doors that transmit ambient light from outdoors) etc., where conventional people counting systems with optical detectors have difficulty locating targets 160 of interest due to large levels of background radiation not emitted by the illuminator 110 and reflected by targets 160, other people or objects 114.

FIGS. 2-4 illustrate some illustrative examples of co-locating the retroreflective tag 130 with the target. For instance, in one example, it may be desirable to identify specific groups of people (e.g., staff members) or objects 114, referred to as "target" 160 or "targets 160" for various purposes disclosed herein. Accordingly, the retroreflective tag 130 may be provided to the target(s) 160 according to the embodiments disclosed in FIGS. 2-4. In FIG. 2, the retroreflective tag 130 is provided in the form of a lanyard ribbon that may be worn around the neck of the target 160. In additional or alternative embodiments illustrated in FIG. 2, the retroreflective tag 130 can be in the form of an identity badge and can be worn by a target 160. In additional or alternative embodiments illustrated in FIG. 3, retroreflective material may be attached to the staff uniform 170, such as a stripe across the back or extending over the shoulders. While FIGS. 2 and 3 illustrate the retroreflective tag 130 provided on a person, it should be understood that the "target" 160 need not be a person or a group of people, and may instead of or in addition be an object or group of objects 114. For instance, FIG. 4 illustrates the retroreflective tag 130 attached to a shopping cart (e.g., front and/or on the back). In other embodiments, the retroreflective tag 130 may be provided on other objects 114 including objects 114 that may remain generally stationary (e.g., items of value in a store), and be occasionally transported. Such embodiments may be beneficial in applications other than people counting, for instance, inventory tracking and/or theft or loss reduction.

In certain embodiments, the retroreflective tag 130 may be configured to reflect incident radiation at selected wavelengths. For example, the retroreflective tag 130 can have a wavelength-dependent reflectivity such that the retroreflective tag 130 reflects generally all the incident electromagnetic radiation over a first wavelength range and be non-reflective to incident electromagnetic radiation over a second wavelength range. For instance, in embodiments where the illuminator 110 is an infrared source and/or the detector 120 is an infrared camera or another detector 120 sensitive to infrared radiation, the first wavelength range can correspond to at least portions of the infrared spectrum. For instance, the retroreflective tag 130 can have a higher reflectivity at wavelengths of between about 700 nanometers and about 3000 nanometers relative to other portions of the electromagnetic spectrum. In some such embodiments, the retroreflective tag 130 can reflect greater than about 60% of incident radiation in the wavelength range between about 700 nanometers and about 3000 nanometers. In particularly preferred embodiments, the retroreflective tag 130 can reflect about 90% of the incident radiation in the wavelength range between about 700 nanometers and about 3000 nanometers while not reflecting incident radiation at wavelengths other than these spectral ranges. It should be understood that the retroreflective tag 130 can be configured to have reflectivity in other wavelengths suitable for a particular application, and not just the disclosed wavelengths.

In certain aspects, the retroreflective tag 130 can be coated to have desired spectral characteristics (e.g., reflectivity in selected wavelength ranges). In one embodiment, the retroreflective tag 130 may include retroreflective beads, such as glass spheres (or microspheres) coated (or metallized) with a metal coating (e.g., aluminum) to achieve high reflectivity. Appreciably, in certain advantageous embodiments, retroreflective materials contemplated herein may produce an apparently higher reflectivity than other surfaces because ordinarily, such surfaces scatter light in several directions and only a small percentage of the incident beam may return to the detector 120. In further advantageous aspects, a signal to noise ratio of the detector 120 may be improved by co-locating (e.g., positioning adjacent to each other) the illuminator 110 with the detector 120, since, appreciably, retroreflective materials strongly reflect the incident beam of electromagnetic radiation in a generally parallel, and opposite direction toward the detector 120. An intensity of electromagnetic radiation reflected by the retroreflective material in directions other than the direction of the incident beam may be significantly lower relative to the intensity of electromagnetic radiation reflected by the retroreflective material in a direction parallel and opposite to the incident beam (as will be described further below with reference to FIG. 7B). Accordingly, as a result of strong directional reflectivity of the retroreflective material, systems and methods disclosed herein can clearly distinguish electromagnetic radiation reflected by the retroreflective tag 130 from background electromagnetic radiation. Alternative materials such as fabrics, pigments or dyes that provide high reflectivity at wavelength ranges of interest (e.g., infrared pass filters) can be used to form the retroreflective tag 130. Several commercially available fabrics can be suitable for this purpose, and may be reflective in one or more wavelength ranges (visible, infrared) and/or transparent in one or more wavelength ranges (infrared, visible, respectively). For example, retroreflective tag 130 can include, but may not be limited to badges and labels manufactured by OscarDelta Limited, United Kingdom.

In optional embodiments, while reflecting nearly all the incident radiation in a particular wavelength range, the retroreflective tag 130 may have an inconspicuous appearance in visible light, so as to be non-intrusive. For instance, in the embodiments illustrated in FIGS. 5A and 5B, the retroreflective tag 130 may be opaque to visible light (as seen in FIG. 5A), and/or may not reflect any incident radiation in the visible spectrum while appearing highly reflective in another portion of the electromagnetic spectrum (e.g., infrared, as shown in FIG. 5B). Accordingly, the retroreflective tag 130 may appear dark or nearly invisible when lit by visible radiation (e.g., between about 300 nanometers and about 700 nanometers). Such embodiments may advantageously be non-intrusive, for instance, if the retroreflective tag 130 is provided as a part of staff uniforms. While visible and infrared radiation is used for illustrating the differing appearance of the retroreflective tag 130, it should be understood that these portions of the spectrum are used for illustrative purposes. The retroreflective tag 130 may have a different appearance in other portions of the electromagnetic spectrum.

Referring again to FIG. 1, the detection system 100 includes an image processor 140. The image processor 140 can be in operative communication with the illuminator 110 and/or the detector 120. The image processor 140 can process signals (or images) detected by the detector 120 and determine the presence or absence of the retroreflective tag 130. The image processor 140 may additionally perform a count of persons or groups of persons (or objects 114 or groups of objects 114) according to one or more processing algorithms as will be described elsewhere herein. The image processor 140 can, in some embodiments, be application specific integrated circuits (ASICs), microcontrollers, microprocessors, field-programmable gate arrays (FPGAs), or any other appropriate structure capable of receiving and processing data, as well as, circuitry distributed across a network to receive and process data and control system operation as described herein from a remote location. The image processor 140 can process signals or data received from the detector 120 based on a software program or an executable set of instructions stored in a non-transitory computer readable medium.

Figure 6:
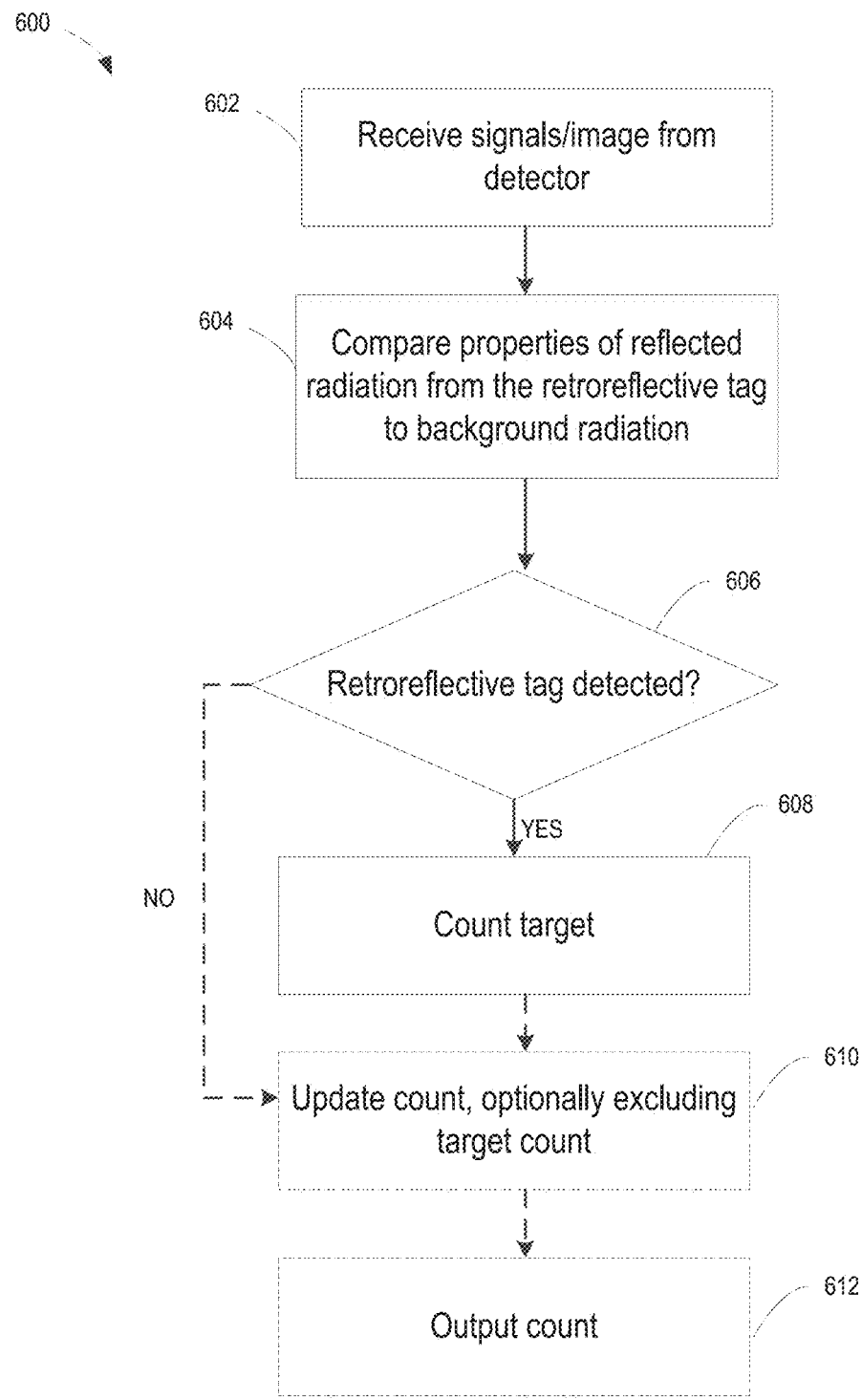
FIG. 6 is an algorithm for detecting a target according to an embodiment.

FIG. 6 illustrates one embodiment of an algorithm 600 using which the image processor 140 detects the retroreflective tag 130. Prior to the image processor 140 executing the algorithm 600, the illuminator 110 generates electromagnetic radiation and illuminates a space 112. The space 112, as described previously can be a public space 112 such as airport walkways, shopping malls, train stations, hospitals, or areas such as warehouses, shop floors, or security facilities. Further, prior to the image processor 140 executing the algorithm 600, the retroreflective tag 130 reflects the incident electromagnetic radiation toward the detector 120. The detector 120 (e.g., a photodetector, an optoelectronic sensor, or camera) may also convert the electromagnetic radiation reflected by the retroreflective tag 130 into signals (e.g., electrical signals).

Referencing FIG. 6, the image processor 140 can receive the signals produced by the detector 120 at step 602. The image processor 140 can, at steps 604-608, isolate the target 160 from background people or objects 114. The image processor 140 may accomplish this at step 604 by comparing the intensity of reflected electromagnetic radiation received from the retroreflective tag 130 and the intensity of reflected electromagnetic radiation received from background objects 114 or persons.

As described previously, the retroreflective tag 130 can be configured such that nearly all incident radiation is directed toward the detector 120, and may have a much higher intensity relative to background electromagnetic radiation. FIG. 7B illustrates one such case. As seen in FIG. 7B, an intensity (e.g., peak intensity) of electromagnetic radiation reflected from the retroreflective tag 130 (shown in solid line) is much higher than the intensity (e.g., peak intensity) of electromagnetic radiation emitted by the illuminator 110 and reflected from other surfaces in the scene 112 and background electromagnetic radiation not emitted by the illuminator 110, and reflected from targets 160, other people or objects 114 (e.g. ambient lighting, sunlight, multiple reflections from reflective surfaces such as white paint, glass etc.). As described previously, the intensity of the beam reflected by the retroreflective tag 130 in a direction parallel and opposite to the incident beam may be much higher than background electromagnetic radiation and electromagnetic radiation emitted by the illuminator 110 and reflected from other surfaces in the scene 112. Accordingly, in some exemplary embodiments, the image processor 140 may reject electrical signals corresponding to reflected electromagnetic radiation having an intensity below a threshold intensity. The threshold intensity may be set, for example, based on prior data of typical levels of electromagnetic radiation emitted by the illuminator 110 and reflected from other surfaces in the scene 112 and background electromagnetic radiation, not emitted by the illuminator 110, and reflected from targets 160, other people or objects 114 (e.g. ambient lighting, sunlight, multiple reflections from reflective surfaces such as white paint, glass etc.) in the scene 112. Alternatively, the threshold intensity may be set based on percentage of the peak intensity currently or previously measured by the detector 120. For instance, the image processor 140 may set the threshold intensity to be about 50% of the peak intensity. Accordingly, any detected radiation (including those not emitted by the illuminator 110 and reflected by targets 160, other people or objects 114) below the threshold intensity would be rejected by the image processor 140 in determining whether or not the target 160 is present in the scene 112. Any additional or alternative methods may be used to exclude background electromagnetic radiation.

At step 606, the image processor 140 determines whether the retroreflective tag 130 is present if the signals from the detector 120 correspond to reflected electromagnetic radiation having an intensity greater than a threshold intensity. At step 608, the image processor 140 can exclude the target 160 from the count totals if the retroreflective tag 130 was identified during the count. At optional step 610, the image processor 140 may proceed to count one or more targets 160 based on whether the retroreflective tag 130 is present. For instance, in one example, the image processor 140 can increment a counter each time a signal received from the detector 120 corresponds to reflected electromagnetic radiation having an intensity greater than a threshold intensity. In addition, at optional step 610, the image processor 140 can also perform counts based on electromagnetic radiation emitted by the illuminator 110 and reflected from other surfaces in the scene 112 to detect objects 114 or people other than the target 160, for example, using methods described in the commonly assigned patent publications U.S. 2017/0316262A1 and U.S. 2015/0032556A1 the entire contents of each of which is hereby incorporated by reference. Further, at optional step 612, the image processor 140 can output one or more counts based on the detected electromagnetic radiation. For instance, in one embodiment, the image processor 140 can output the total count of people or objects 114 in a scene 112. Further, in another embodiment, the image processor 140 can also output the total count of people or objects 114 in a scene 112 excluding the target 160 (e.g., those having a retroreflective tag 130). Such embodiments may be advantageous if it is desired to determine a count of only the customers waiting in line, or to detect if any unauthorized personnel (e.g., people without retroreflective staff identification badges) are present in a secure facility. In further embodiments, the image processor 140 can output only the number of targets 160 in a scene 112. Such embodiments may be useful for personnel or inventory tracking.

Figure 7A:
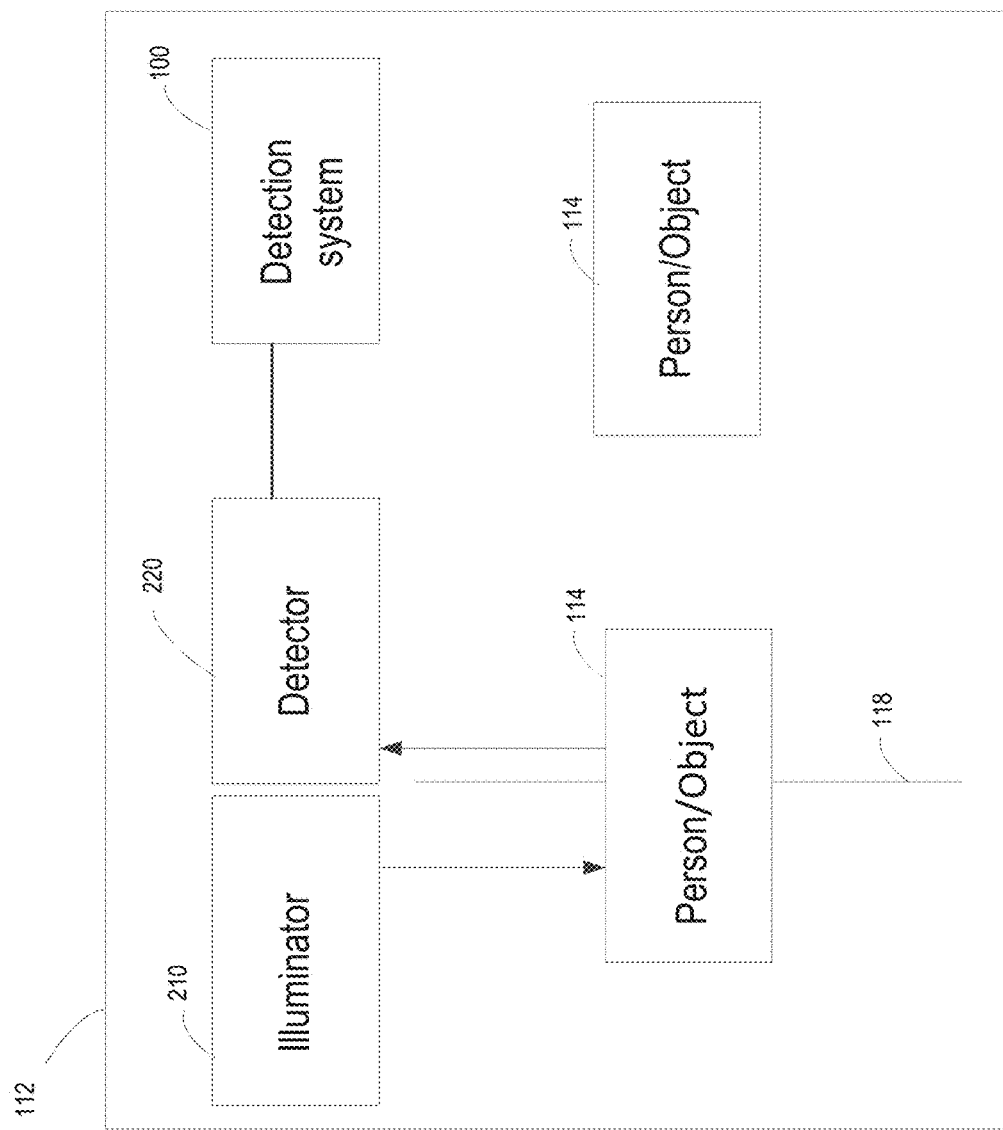
FIG. 7A illustrates a second detection system used in conjunction with the detection system of FIG. 1.
Figure 7B:
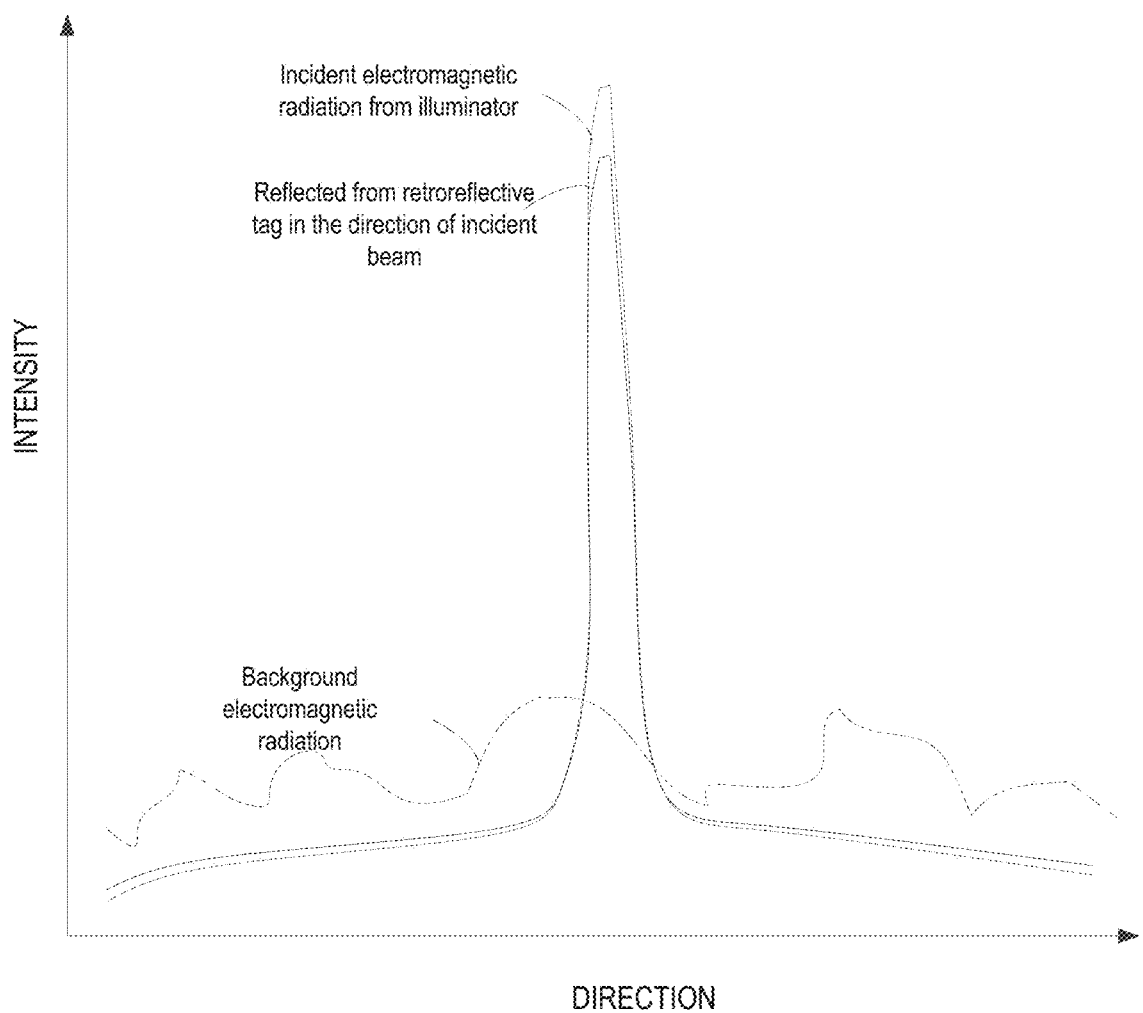
FIG. 7B is an illustrative example graph that shows an intensity of electromagnetic radiation reflected from the retroreflective tag (shown in solid line) and an intensity of background electromagnetic radiation (shown in dashed lines) present in the scene.

In further embodiments, referencing FIG. 7A, a second detection system 100 can be used for determining a count of people or objects 114 in the scene 112 (e.g., including the target). The second detection system 100 can be used in addition to and/or in conjunction with the detection system 100 (illustrated in FIG. 1) for determining a count of people or objects 114. Accordingly, in some such embodiments, the second detection system 100 can include a second illuminator 210 and a second detector 220. The second illuminator 210 can be ambient (background) lighting (e.g., sunlight or artificial sources of light other than the illuminator 110 described herein). Any sources of light in the scene 112, including sunlight, overhead lights, and the like can be used as the second illuminator 210. The second detector 220 can be a passive system such as a video or stereo video system. Alternatively a thermal detector may be used (e.g. Gazelle 2 Dual View System) where thermal radiation from warm bodies (people or objects 114) in the scene 112 is used to detect the presence and track people and objects 114 in the scene 112. In such systems, for example, a count may be performed by monitoring people or objects 114 crossing a line 118 on a floor of a location. The targets 160 may appear differently in the captured image (or detected signals), and the separate system may also be able to distinguish and exclude targets 160 from the scene 112. However, for improving the accuracy of detection of targets 160, in such embodiments, use of illuminator 110 (e.g., high-frequency modulated light) may be preferred. Appreciably, the illuminator 110 and illuminator 210 may illuminate both targets 160 and other objects 114 and people. However, as will be described further below (and referencing FIG. 7B), an intensity of electromagnetic radiation reflected by the retroreflective tag 130 in the direction of an incident beam from the illuminator 110 may be greater than any other intensity of electromagnetic radiation in the scene 112. Accordingly, returning to FIG. 7A, in such embodiments, the image processor 140 would receive images (or signals) indicative of a total count of all people or objects 114 in the scene 112 from the second detector 220 (e.g., all people or objects 114 that cross a particular point or line in the scene 112). The image processor 140 would also receive images (or signals) corresponding to just the targets 160 (reflected by the retroreflective tag 130) from the detector 120. The image processor 140 would, in such cases, process signals (or images) from both the detector 120 and the second detector 220, to distinguish the targets 160 in the scene 112. Optionally, the image processor 140 can also perform one or more of the following additional post-processing steps: distinguishing and tracking just the targets 160 in the scene 112, distinguishing and tracking objects 114 or people other than the targets 160 in the scene 112, and excluding a count of targets 160 from the total count, and other processes, such as those that will be described further below.

Figure 8:
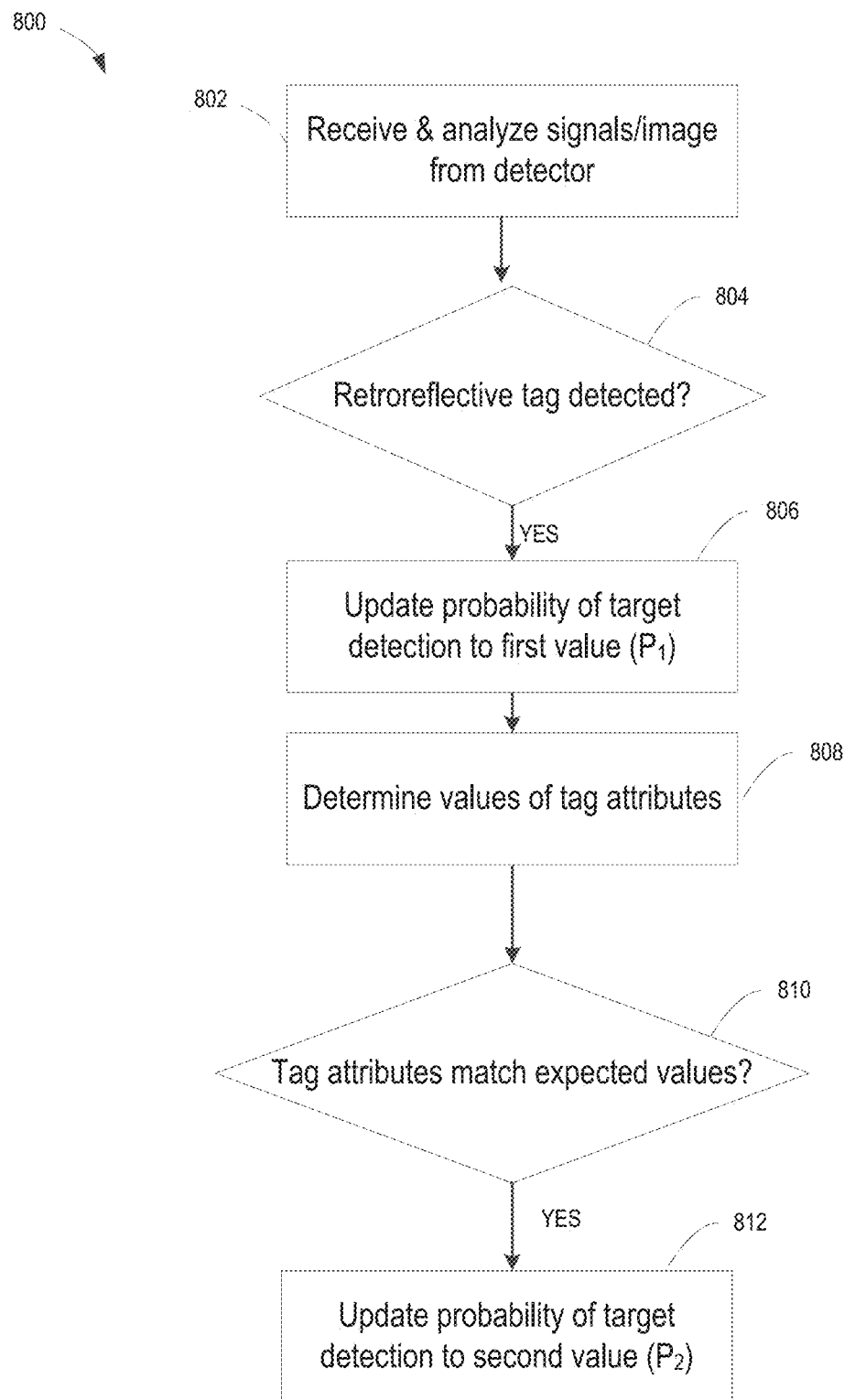
FIG. 8 is an algorithm for detecting a target according to another embodiment.

FIG. 8 illustrates another algorithm 800 for determining the presence of a retroreflective tag 130. At step 802, the image processor 140 receives signals detected (or images captured) by the detector 120. At step 804, the image processor 140 determines (e.g., using algorithm 600) whether the detected signals is indicative of the retroreflective tag 130 being present. At step 806, the image processor 140 updates a probability of the target 160 being present in the scene 112 to a first value ($P_1$). The image processor 140 can use one or more probability calculation models to determine the first value ($P_1$) and/or update a probability that the target 160 is present in the scene 112. In some exemplary embodiments, the image processor 140 can use Bayesian models, recurrent neural networks, Markov models, or other statistical models. Alternatively, a non-probabilistic model could be used, such as a state machine with thresholds and transitions.

In some embodiments, the accuracy with which the image processor 140 determines whether the target 160 is present in the scene 112 can be improved by determining additional characteristics of the retroreflective tag 130. For example, in some embodiments, the retroreflective tag 130 can have attributes which can be analyzed by the image processor 140 to improve the accuracy with which the image processor 140 determines whether the target 160 is present in the scene 112. The attribute can be physical properties of the retroreflective tag 130 such as tag shape, tag color, tag height and the like. The attribute can also be (or indicative of) reflective properties such as intensity of the electromagnetic radiation reflected by the tag relative to background intensity, wavelength of the reflected electromagnetic radiation, polarization of the reflected electromagnetic radiation and the like. Such embodiments may be useful in scenarios where the detection system 100 may have to exclude staff members from a total count to get a more accurate count. By identifying specific attributes of the retroreflective tag 130, the image processor 140 may determine whether the retroreflective tag 130 having a specific set of attributes has been detected multiple times in an area, which may indicate that a single staff member wearing or carrying the retroreflective tag 130 having a specific set of attributes has crossed the area multiple times. The image processor 140 may then proceed to subtract the multiple detections of the same retroreflective tag 130 having the specific set of attributes so as to get a more accurate count.

In some such embodiments, referring to FIG. 8, at step 808, the image processor 140 can determine the values of tag attributes, and at step 810, determine whether attribute of the retroreflective tag 130 has a value that matches an expected value. For example, in one embodiment, the image processor 140 can compare the tag shape as detected by the detector 120 (e.g., based on signals or image captured by the detector 120) to an expected tag shape (e.g., rectangular). Additionally, or alternatively, the image processor 140 can compare the dimensions of the tag as detected by the detector 120 (e.g., based on signals or image captured by the detector 120) to an expected tag dimensions (in length and width, for instance). Additionally, or alternatively, the image processor 140 can compare the height of the tag as detected by the detector 120 (e.g., based on signals or image captured by the detector 120) to an expected tag height (e.g., whether the tag is at a height corresponding to shoulder level, waist level, at the same level as the handle of a shopping cart). In additional or alternative embodiments, the image processor 140 can compare a tag color as detected by the detector 120 (e.g., based on signals or a visible or infrared image captured by the detector 120) to an expected tag color (e.g., colors in visible spectrum and/or intensity or wavelength in infrared spectrum). In further optional embodiments, the image processor 140 can also compare and/or verify that the properties of the reflected electromagnetic radiation generally matches expected values (e.g., of the expected wavelength range and/or having an expected polarization).

At step 812, the image processor 140 can update the probability of detection of the target 160 to a second value ($P_2$) if the attribute of the retroreflective tag 130 has a value that matches an expected value. The second value ($P_2$) can be, in advantageous embodiments, greater than the first value ($P_1$) obtained at step 806. The image processor 140 can use one or more probability calculation models to determine the second value. In some exemplary embodiments, the image processor 140 can use Bayesian models, recurrent neural networks, Markov models, or other statistical models. Alternatively, a non-probabilistic model could be used, such as a state machine with thresholds and transitions.

While FIGS. 6 and 8 describe the image processor 140 as performing a count and/or updating probability, in additional or alternative embodiments, the counting and/or updating probability may be done by a separate system (e.g., a computer having processor, memory, storage and/or network connections). In such embodiments, the image processor 140 may simply distinguish and/or identify the retroreflective target from background electromagnetic reflections and reflections resulting from other objects 114 or people when illuminated by the illuminator 110. Desired counts and probability estimation may be carried out as a separate step involving a separate system and/or method.

In some embodiments, the detection system 100 can advantageously identify unique groups of people or objects, or unique individuals or objects. In one such embodiment, the retroreflective tag 130 can have an appearance corresponding to a unique code. For example, the retroreflective tag 130 can be a barcode having retroreflective properties. Alternatively, the retroreflective tag 130 can be a QR code having retroreflective properties. In such cases, the retroreflective tag 130 can have discrete bands of opaque and (retro) reflective stripes.

Figure 9:
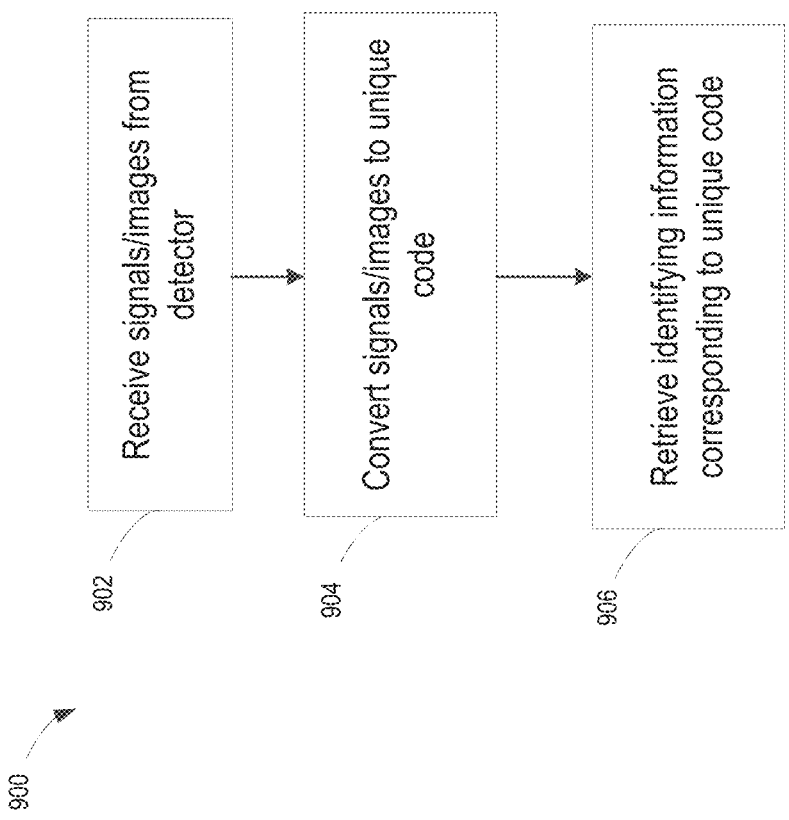
FIG. 9 is an algorithm for identifying unique individuals or objects (or groups of individuals or groups of objects) according to an embodiment.

FIG. 9 illustrates one such algorithm 900 for identifying unique individuals, unique objects, unique group of individuals or unique group of objects. The image processor 140 can receive signals (or images) from the detector 120 at step 902. At step 904, upon receipt of signals (or images) corresponding to reflected electromagnetic radiation from the retroreflective tag 130, the image processor 140 can convert the signals or images into a unique code (e.g., barcode or QR code). The image processor 140 can read the unique code because the barcode and/or the QR code may have discrete bands of opaque and retroreflective stripes. The detected signals (or captured image), in such cases, would correspond to similarly discrete bands of dark and retroreflective stripes, which can be associated with a unique code.

At step 906, the image processor 140 can retrieve (e.g., from local or remote storage or memory) an identity of the individual or object, group of individuals or group of objects. In one example, the association between the unique code (e.g., barcode or QR code) and the identity of the individual or object, or group of individuals or objects can be stored in the form of a lookup table. In an example, the image processor 140 can retrieve the identity comprising identifiable information of the individual or object or group of individual or group of objects.

While a barcode or a QR code is described and illustrated, it should be understood that the method 900 may alternatively rely upon tag attributes (e.g., size, shape, color, height, reflectivity, etc.) and associate a set of attributes with an individual or an object (or a group of individuals or objects). For instance, a first group of staff members may wear tags of a particular size, shape or color, and a second group of staff members may wear tags of a different size, shape or color. Accordingly, even in the absence of a retroreflective tag 130 coded as a barcode or a QR code, the image processor 140 may be able to identify unique individuals or objects (or group of individuals or objects) based on one or more tag attributes.

Methods such as 900 can advantageously facilitate excluding staff members from a count (for instance, from a shopping checkout line) and/or help distinguish authorized and unauthorized personnel in an area. Methods such as 900 can also advantageously facilitate tracking and monitoring certain objects (e.g., individual vehicles, shipping containers, etc.) or certain groups of items (e.g., items of high value in a retail establishment).

In some embodiments, by providing a plurality of detectors distributed in a location, systems and methods disclosed herein can be used to determine a path travelled by the target 160 in the location. Such embodiments can be advantageous to detect and identify quantities of interest, such as dwell time, whether a target 160 is moving in a preferred (e.g., authorized) direction, and the like. In an embodiment, the location can be a retail location (e.g., a store). A plurality of detectors can be distributed at various portions of the store (e.g., at different aisles, near the door, etc.) Each detector 120 can be in operative communication with the image processor 140. The image processor 140 can receive signals (and/or captured images) from one or more detectors to track the path of the target 160 in the location. In some embodiments, the image processor 140 can track the path of the target 160 by interpolating the detected location of the target 160 in the vicinity of one or more detectors. The image processor 140 can also identify additional data such as the amount of time spent at each of the sub-locations within the measured location, time of travel, direction taken by the target, and the like.

In additional or alternative embodiments, the detection system 100 may be able to track a target 160 using a single detector 120. In some such embodiments, the detector 120 can record detected signals (or a set of images and/or video) corresponding to the retroreflective tag 130 over time. The image processor 140 can, in such embodiments, receive the recorded data, analyze the signals and/or images or video (for instance, using any of the disclosed algorithms) over time and thereby "track" the path of the target 160. The image processor 140 can also identify additional data such as the amount of time spent at each of the sub-locations within the measured location, time of travel, direction taken by the target 160, and the like.

Figure 10:
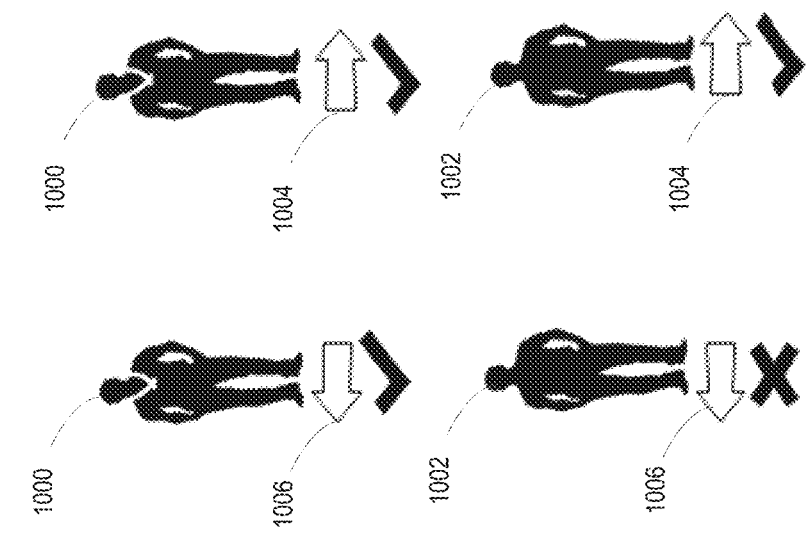
FIG. 10 is an exemplary implementation of the systems and methods disclosed herein to detect permissible and impermissible directions of travel.

FIG. 10 is a schematic illustrating an exemplary implementation of the systems and methods disclosed herein to detect a direction of travel of a target. In FIG. 10, the target 1000 is an authorized target 1000 (staff member), and the target 1002 (visitor) is an unauthorized target 1002. The direction 1004 is a permissible direction of travel (e.g., toward a concourse, a platform or a lounge in an airport or train station) for both the authorized target 1000 and the unauthorized target 1006. The direction 1006 (e.g., toward a secure facility, runway, train tracks, etc.) is a permissible direction of travel for only the authorized target 1000. The detection system 100 according to embodiments disclosed herein can detect the direction of movement of both the authorized target 1000 and the unauthorized target 1002. If the detection system 100 detects (e.g., via image processor 140 and one or more algorithms 600, 800 and 900) that the unauthorized target 1002 is traveling in the direction 1006, then the detection system 100 can generate an alarm (e.g., an audible signal) and the like to communicate to the unauthorized target 1002 that the direction of travel 1006 is impermissible.

In certain aspects, referring back to FIG. 1, the image processor 140 can be in operative communication with an output device 150 such as a display, an alarm, speakers, etc. For instance, the image processor 140 can send, over a wired or wireless network, signals corresponding to different outputs. In one embodiment, the output can be a "yes or no" detection of the target. In additional or alternative embodiments, the output can be identifying information regarding a target (an individual, an object, a group of individuals, a group of objects). Alternatively, or in addition, the output can be a count (e.g., a number of individuals or objects in a location, a number of staff members, a number of customers, etc.). Further, the output can be quantities such as distance from the detector (e.g., depth), direction, path of travel, dwell time, and the like. In optional embodiments, the output can also be an alarm issued to security personnel if the image processor 140 determines that the target is travelling in a direction toward an unauthorized area (e.g., individual gaining entry in a secure facility, a stolen object, a vehicle departing from a programmed route, and the like).

Various examples have been described. These and other examples are within the scope of the following claims.

The invention claimed is:

1. A detection system for detecting targets in a scene, comprising:
an illuminator configured to generate electromagnetic radiation and thereby illuminate the scene;
a detector configured to receive electromagnetic radiation from the scene;
one or more retroreflective tags, each being attached to or positioned near a corresponding target, each of the one or more retroreflective tags being configured to reflect incident electromagnetic radiation received from the illuminator toward the detector such that:
a direction of the electromagnetic radiation reflected by the one or more retroreflective tags is generally parallel and opposite to a direction of the incident electromagnetic radiation received from the illuminator; and
the electromagnetic radiation received by the detector comprises the electromagnetic radiation reflected by the one or more retroreflective tags and background electromagnetic radiation; and
an image processor in operative communication with the detector, the image processor being configured to:
analyze the electromagnetic radiation received by the detector to identify the electromagnetic radiation reflected by the one or more retroreflective tags;
determine a presence of some of the one or more retroreflective tags in the scene;
count a number of retroreflective tags present in the scene based on the presence of the some of the one or more retroreflective tags in the scene; and
determine a number of targets in the scene based on the number of retroreflective tags present in the scene.

2. The detection system of claim 1, wherein the image processor is configured to count a number of people present in the scene based on the electromagnetic radiation received by the detector.

3. The detection system of claim 1, wherein each of the one or more retroreflective tags includes retroreflective portions and non-retroreflective portions that, when the electromagnetic radiation generated by the illuminator is incident thereupon, reflect the electromagnetic radiation generated by the illuminator in a pattern that corresponds to a unique code for the retroreflective tag, the unique code for the retroreflective tag being unique to the retroreflective tag and the corresponding target.

4. The detection system of claim 1, wherein, each of the one or more retroreflective tags is configured to reflect electromagnetic radiation only in a first wavelength range, wherein at least one of the one or more retroreflective tags is configured to not reflect electromagnetic radiation in a second wavelength range, such that at least one of the one or more retroreflective tags is not visible when illuminated by electromagnetic radiation of the second wavelength range.

5. The detection system of claim 1, wherein at least one of the one or more retroreflective tags is configured to reflect the incident electromagnetic radiation received from the illuminator such that the incident electromagnetic radiation reflected by the one or more retroreflective tags has an intensity greater than an intensity of background radiation.

6. The detection system of claim 1, wherein the illuminator is configured to generate high frequency modulated electromagnetic radiation, structured electromagnetic radiation, or polarized electromagnetic radiation.

7. The detection system of claim 1, wherein the illuminator is configured such that the electromagnetic radiation generated by the illuminator comprises wavelengths exceeding about 700 nanometers.

8. The detection system of claim 1, wherein the illuminator is configured such that the electromagnetic radiation generated by the illuminator comprises wavelengths corresponding to a near infrared spectrum.

9. The detection system of claim 1, wherein the detector comprises a time of flight camera, and wherein the image processor is configured to detect a distance between the detector and the target corresponding to one of the one or more retroreflective tags based on the electromagnetic radiation reflected by the retroreflective tag corresponding to the target.

10. The detection system of claim 1, wherein the detector comprises an infrared camera, a visible light camera, and an infrared pass filter, such that the detector is configured to detect the electromagnetic radiation reflected by the one or more retroreflective tags at wavelengths greater than 700 nanometers.

11. The detection system of claim 1, wherein the detector comprises a visible electromagnetic radiation camera.

12. A detection system for detecting targets in a scene, comprising:
an illuminator configured to generate electromagnetic radiation and thereby illuminate the scene comprising people;
a detector configured to receive electromagnetic radiation from the scene;
a plurality of retroreflective tags, each attached to or positioned near a corresponding target, each retroreflective tag having a respective, unique code, each retroreflective tag being configured to receive the electromagnetic radiation generated by the illuminator and reflect the electromagnetic radiation generated by the illuminator toward the detector, each of the plurality of retroreflective tags having retroreflective portions and non-retroreflective portions that, when the electromagnetic radiation generated by the illuminator is incident thereupon, reflect the electromagnetic radiation generated by the illuminator in a pattern that corresponds to the respective, unique code for the retroreflective tag, wherein the respective, unique code for the respective retroreflective tag is unique to the respective retroreflective tag and the corresponding target; and
an image processor in operative communication with the illuminator and/or the detector, the image processor being configured to:
analyze the electromagnetic radiation received by the detector to determine a presence of one or more of the plurality of retroreflective tags,
identify one or more unique targets present in the scene based on the respective, unique code of each retroreflective tag of the plurality of retroreflective tags detected by the detector, and
count a number of unique targets present in the scene based on the one or more unique targets.

13. The detection system of claim 12, wherein the respective, unique code for each retroreflective tag is a barcode or a QR code.

14. A detection system for detecting targets in a scene, comprising:
an illuminator configured to generate electromagnetic radiation over a first wavelength range and illuminate the scene;
a detector configured to receive electromagnetic radiation from the scene illuminated by the illuminator;
a retroreflective tag attached to or positioned near a target; and
an image processor in operative communication with the detector, the image processor being configured to:
analyze the electromagnetic radiation received by the detector to determine if the electromagnetic radiation received by the detector is indicative of the retroreflective tag being in the scene,
update a probability of the target being present in the scene to a first value if the image processor determines that the retroreflective tag is present in the scene,
analyze the electromagnetic radiation received by the detector to determine a value of an attribute,
compare the value of the attribute of the retroreflective tag to an expected value of the attribute, and
if the value of the attribute of the retroreflective tag matches the expected value, update the probability of the target being present in the scene to a second value, the second value being greater than the first value.

15. The detection system of claim 14, wherein the retroreflective tag has a reflectivity configured to reflect generally all incident electromagnetic radiation over the first wavelength range, such that in the scene captured by the detector, the retroreflective tag has an intensity greater than an intensity of background objects in the scene.

16. The detection system of claim 14, wherein the image processor is configured to isolate the electromagnetic radiation over the first wavelength range reflected by the retroreflective tag from background electromagnetic radiation reflected by objects other than the targets in the scene captured by the detector.

17. The detection system of claim 14, wherein the image processor is configured to determine the first value of the probability and the second value of the probability based on at least one of a position of the retroreflective tag on the target, tag color, tag shape.

18. The detection system of claim 14, wherein the image processor is configured to determine a path travelled by the target in the scene based on previous data corresponding to a previous detection of the retroreflective tag attached to or positioned near the target in the scene.

19. The detection system of claim 18, wherein the image processor is configured to determine a direction travelled by the target in the scene, the image processor being in communication with an output device to generate an output if the image processor determines that the direction travelled by the target is toward an unauthorized area.

20. The detection system of claim 14, further comprising a counting system comprising a second detector, the counting system being separate from the detection system, and in operative communication with the image processor of the detection system, wherein the image processor is configured to count a number of people present in the scene based on the electromagnetic radiation received by the second detector.

21. The detection system of claim 20, wherein the counting system comprises a second illuminator separate from the illuminator of the detection system.

22. The detection system of claim 1, wherein the image processor is further configured to:
- analyze the electromagnetic radiation received by the detector to determine a total number of objects in the scene;
- subtract the number of targets in the scene from the total number of objects in the scene to determine an adjusted number of objects in the scene; and
- determine a number of alternate targets in the scene as the adjusted number of objects in the scene.

\* \* \* \* \*